(12) United States Patent
Khosravi et al.

(10) Patent No.: US 7,200,146 B2
(45) Date of Patent: Apr. 3, 2007

(54) SYSTEM AND METHOD OF IP PACKET FORWARDING ACROSS DIRECTLY CONNECTED FORWARDING ELEMENTS

(75) Inventors: Hormuzd M. Khosravi, Hillsboro, OR (US); Sanjay Bakshi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 970 days.

(21) Appl. No.: 09/932,294

(22) Filed: Aug. 17, 2001

(65) Prior Publication Data
US 2003/0039245 A1 Feb. 27, 2003

(51) Int. Cl.
H04L 12/28 (2006.01)
H04L 12/56 (2006.01)
H04L 12/40 (2006.01)

(52) U.S. Cl. .................. 370/392; 370/400
(58) Field of Classification Search ........... 370/390, 370/392, 401, 405, 218, 432, 381, 389, 351, 370/257–258, 451–452, 438–439
See application file for complete search history.

(56) References Cited

U.S. PATENT DOCUMENTS 5,566,170 A * 10/1996 Bakke et al. ............... 370/392
5,828,844 A * 10/1998 Civanlar et al. ............ 709/228
5,852,606 A * 12/1998 Prince et al. ............ 370/395.53
6,449,275 B1 * 9/2002 Andersson et al. ..... 370/395.31
6,807,175 B1 * 10/2004 Jennings et al. ............ 370/390

* cited by examiner

*Primary Examiner*—Huy D. Vu
*Assistant Examiner*—Daniel Ryman
(74) *Attorney, Agent, or Firm*—Schwegman, Lundberg, Woessner & Kluth, P.A.

(57) ABSTRACT

Systems and methods are provided through which a packet is transferred within a router through the use of a switch-label. The switch-label is generated upon receipt by a component of the router. The switch label indicates an address within the router of another component within the router that will transmit the packet to a destination outside the router. The switch-label uses an abbreviated address of components within the router. The address is abbreviated because the number of potential addresses within a router is significantly less than the number of addresses outside the router that require a fill address. As a result, transferring of the packet within the router is faster because processing the switch-label using an abbreviated address is faster than processing a full address.

17 Claims, 7 Drawing Sheets

SYSTEM AND METHOD OF IP PACKET FORWARDING ACROSS DIRECTLY CONNECTED FORWARDING ELEMENTS

TECHNICAL FIELD OF THE INVENTION

The present invention relates generally to computer networking and in particular the present invention relates to the forwarding elements in a router.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001, Intel Corporation, All Rights Reserved.

BACKGROUND OF THE INVENTION

In recent years, a new trend has emerged in the networking industry. Devices such as routers and switches have begun to evolve from monolithic, highly customized and integrated designs into aggregations of discrete, modularized components. Intel® Open Networking is an architecture with open interfaces for flexible deployment of new network services and technology. This architecture demonstrates modular design by separating control and management functions through a control element (CE) of a network device from forwarding elements (FEs) that perform data forwarding functions. This type of architecture takes advantage of the best-of-the-breed network forwarding hardware while not requiring changes in the control software. In Open Networking architecture, a network device consists of a set of FEs controlled by single or multiple CE(s). The FEs can be interconnected in some arbitrary topology. While the architecture of Open Networking provides many advantages over monolithic designs, it also introduces new challenges in preserving the behavior of a standard networking device. One such challenge is the routing of packets through the set of forwarding elements in a network element with multiple FE elements. For example, when a single-box router forwards a packet, it executes a lookup in the routing table for the destination Internet protocol (IP) address.

In conventional systems, the router table lookup is based on the longest-prefix match. The longest-prefix match analyzes or evaluates the entire IP address to determine the next hop in the packet forwarding. The longest-prefix matches are time consuming, and unnecessary when the packet is forwarded within a router.

This process (often called route lookup), is time-consuming and limits the performance of the router. Other associated operations in the forwarding process include validating the header checksum, decrementing the time-to-live (TTL), and then recalculating and updating the header checksum. In the network element with multiple FE elements, packets might pass through multiple FEs, and when each FE performs route lookup and performs the other associated operations on the packet, the performance of the network element is reduced because of the resources that are required to support the multiple route lookup. Also, the network element will act like a set of routers as opposed to a single logical router since TTL would be decremented multiple times, once by each FE as the packet passes through it. It is important for such a network element with multiple FE elements to act as a single logical router to preserve the behavior of a standard router. Therefore it is important to minimize the route lookup and associated operations.

One conventional model for high-speed routers consists of a number of FEs interconnected by a high-speed switching fabric. These existing routers with multiple FEs use proprietary switching protocol between the FEs to forward packets between them. This current model has proved to be highly efficient, but proprietary interfaces to their hardware prevent innovation by networking independent software vendors (ISVs) and independent hardware vendors (IHVs).

For the reasons stated above, and for other reasons stated below which will become apparent to those skilled in the art upon reading and understanding the present specification, there is a need in the art for more efficient transferring of packets within a router.

DETAILED DESCRIPTION OF THE INVENTION

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

A system, method and apparatus of forwarding a packet through multiple forwarding elements in a router, in which the forwarding elements are directly connected to each other through a bus or switch interconnect/backplane, and in which processing of the packet is required to occur only once while the packet exists in the router, is described herein.

Hardware and Operating Environment

Figure 1:
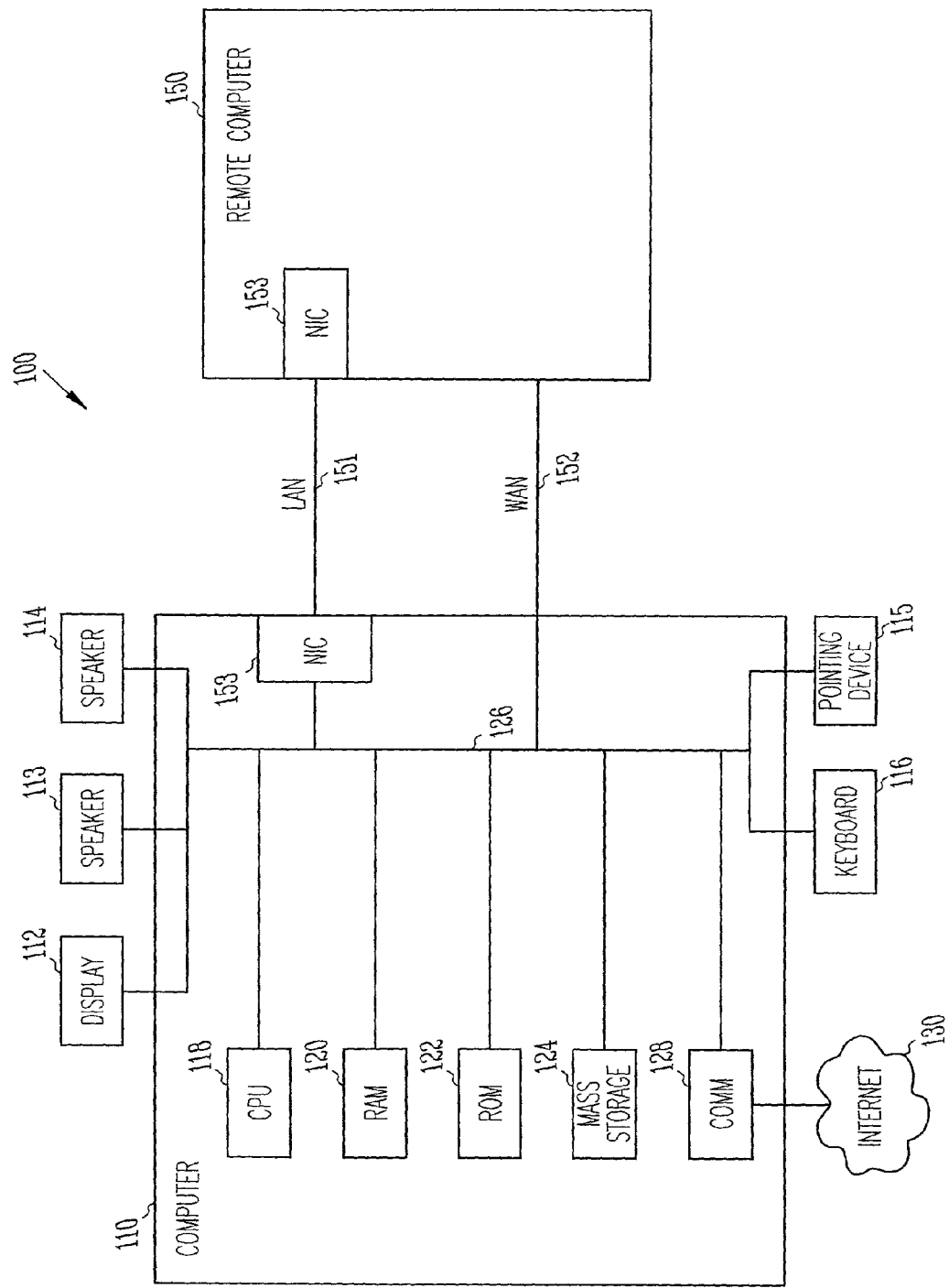
FIG. 1 is a block diagram of the hardware and operating environment in which different embodiments of the invention can be practiced.

FIG. 1 is a block diagram of the hardware and operating environment 100 in which different embodiments of the invention can be practiced. The description of FIG. 1 provides an overview of a computer and a suitable computing environment in conjunction with which some embodiments of the present invention can be implemented. Embodiments of the present invention are described in terms of a computer executing computer-executable instructions. However, some embodiments of the present invention can be implemented entirely in computer hardware in which the computer-executable instructions are implemented in read-only memory. One embodiment of the invention can also be implemented in client/server computing environments where remote devices that are linked through a communications network perform tasks. Program modules can be located in both local and remote memory storage devices in a distributed computing environment.

Computer 110 is operatively coupled to display device 112, pointing device 115, and keyboard 116. Computer 110 includes a processor 118, commercially available from Intel®, random-access memory (RAM) 120, read-only memory (ROM) 122, and one or more mass storage devices 124, and a system bus 126, that operatively couples various system components including the system memory to the processing unit 118. Mass storage devices 124 are more specifically types of nonvolatile storage media and can include a hard disk drive, a floppy disk drive, an optical disk drive, and a tape cartridge drive. The memory 120, 122, and mass storage devices 124, are types of machine-accessible media. A user enters commands and information into the computer 110 through input devices such as a pointing device 115 and a keyboard 116. Other input devices (not shown) can include a microphone, joystick, game pad, satellite dish, scanner, or the like. The processor 118 executes computer programs stored on the machine-accessible media. Embodiments of the present invention are not limited to any type of computer 110. In varying embodiments, computer 110 comprises a PC-compatible computer, a MacOS®-compatible computer or a UNIX®-compatible computer. The construction and operation of such computers are well known within the art.

Furthermore, computer 110 can be communicatively connected to the Internet 130 via a communication device 128. Internet 130 connectivity is well known within the art. In one embodiment, a communication device 128 is a modem that responds to communication drivers to connect to the Internet via what is known in the art as a "dial-up connection." In another embodiment, a communication device 128 is an Ethernet® or similar hardware (network) card connected to a local-area network (LAN) that itself is connected to the Internet via what is known in the art as a "direct connection" (e.g., T1 line, etc.).

Computer 110 can be operated using at least one operating environment to provide a graphical user interface including a user-controllable pointer. Such operating environments include operating systems such as versions of the Microsoft Windows® and Apple MacOS® operating systems, well-known in the art. Embodiments of the present invention are not limited to any particular operating environment, however, and the construction and use of such operating environments are well known within the art. Computer 110 can have at least one web browser application program executing within at least one operating environment, to permit users of computer 110 to access intranet or Internet world-wide-web pages as addressed by Universal Resource Locator (URL) addresses. Such browser application programs include Netscape Navigator® and Microsoft Internet Explorer®.

Display device 112 permits the display of information, including computer, video and other information, for viewing by a user of the computer. Embodiments of the present invention are not limited to any particular display device 112. Such display devices include cathode ray tube (CRT) displays (monitors), as well as flat panel displays such as liquid crystal displays (LCD's). Display device 112 is connected to the system bus 126. In addition to a monitor, computers typically include other peripheral input/output devices such as printers (not shown), speakers, pointing devices and a keyboard. Speakers 113 and 114 enable the audio output of signals. Speakers 113 and 114 are also connected to the system bus 126. Pointing device 115 permits the control of the screen pointer provided by the graphical user interface (GUI) of operating systems such as versions of Microsoft Windows®. Embodiments of the present invention are not limited to any particular pointing device 115. Such pointing devices include mouses, touch pads, trackballs, remote controls and point sticks. Finally, keyboard 116 permits entry of textual information into computer 110, as known within the art, and embodiments of the present invention are not limited to any particular type of keyboard.

The computer 110 can operate in a networked environment using logical connections to one or more remote computers, such as remote computer 150. These logical connections are achieved by a communication device coupled to, or a part of, the computer 110. Embodiments of the present invention are not limited to a particular type of communications device. The remote computer 150 can be another computer, a server, a router, a network PC, a client, a peer device or other common network node. The logical connections depicted in FIG. 1 include a local-area network (LAN) 151 and a wide-area network (WAN) 152. Such networking environments are commonplace in offices, enterprise-wide computer networks, intranets and the Internet.

When used in a LAN-networking environment, the computer 110 and remote computer 150 are connected to the local network 151 through a network interface or adapter 153, which is one type of communications device. When used in a conventional WAN-networking environment, the computer 110 and remote computer 150 communicate with a WAN 152 through modems (not shown). The modem, which can be internal or external, is connected to the system bus 126. In a networked environment, program modules depicted relative to the computer 110, or portions thereof, can be stored in the remote memory storage device.

System Level Overview

Figure 2:
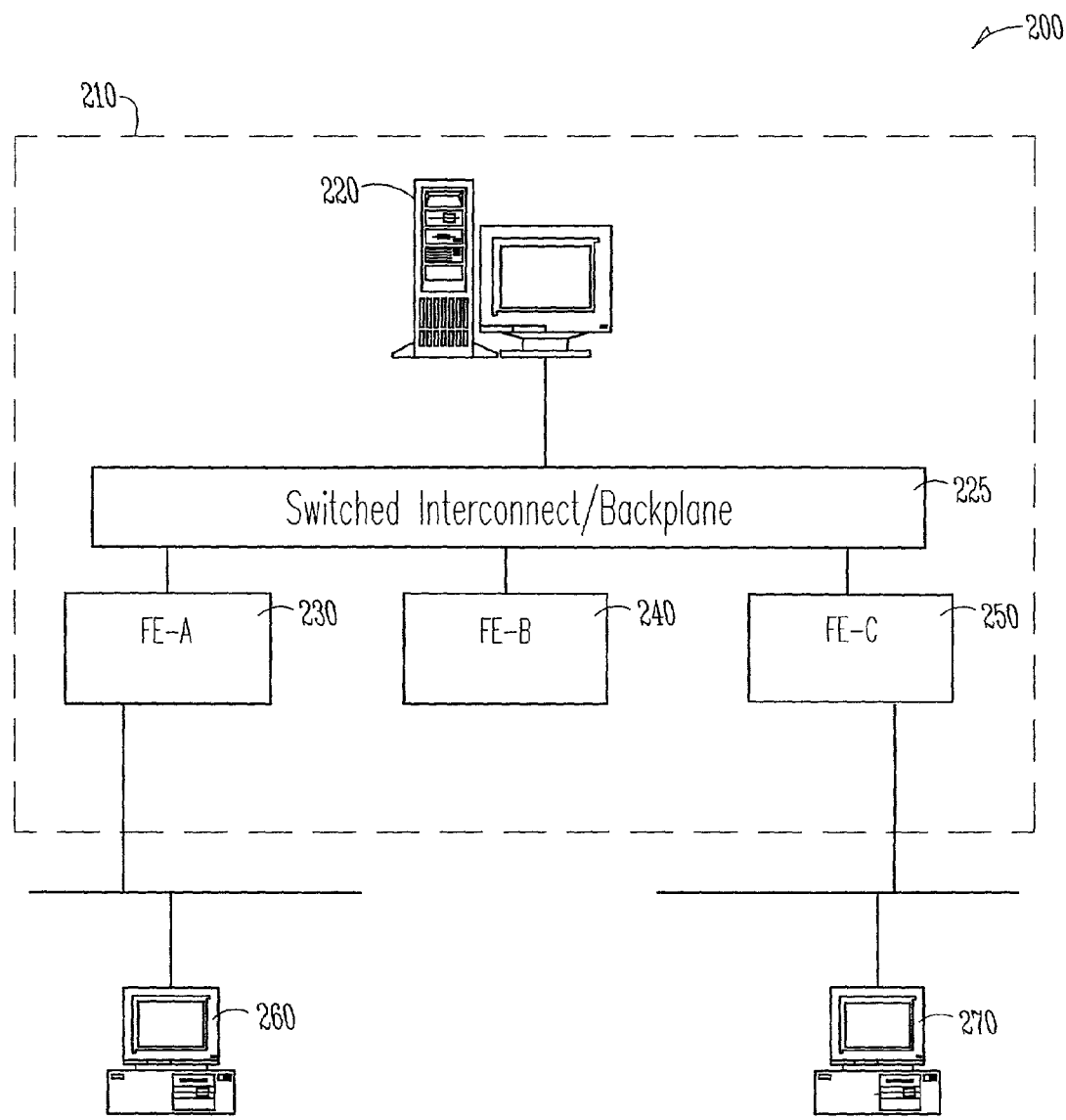
FIG. 2 is a diagram illustrating a system-level overview of an embodiment of the invention.

FIG. 2 is a block diagram that provides a system level overview of the operation of embodiments of the present invention. Embodiments of the invention are described as operating in a multi-processing, multi-threaded operating environment on a computer, such as computer 110 in FIG. 1.

System 200 includes a router 210. The router is composed of a control element 220 operably coupled through a switched interconnect/backplane 225 to a plurality of forwarding elements (FEs), such as FE-A 230, FE-B 240, and FE-C 250. In one embodiment, the coupling includes Ethernet-compliant communication paths. One example of the external networking environment is the Internet. The external networking environment includes computer 260 that send packets destined to computer 270 through the router 210. For every data packet or flow passing through the system, a FE acts as ingress FE, such as FE-A 230, and a FE acts as an egress FE, such as FE-C 250. An ingress-FE is a FE that receives packets from the external networking environment. An egress-FE is a FE that transmits packets to the external networking environment For each packet that is received by ingress FE 230, a switch-label that identifies the route of the packet through or within the router 210 is generated, and associated with the packet. The route is between FEs in the router 210. The switch-label is much easier to process as the packet passes from one FE to the next within the router 210 because of the relative conciseness of the switch-label, in comparison to the longest-prefix match of conventional systems.

For incoming packets, the ingress-FE is responsible for the actions of validating the header checksum, decrementing the time-to-live (TTL), and recalculating and updating the header checksum. However, these actions are not performed by each subsequent FE in the router. Rather, these actions are performed only once, by the ingress-FE, while the packet is transferred within the router 210. In contrast, in conventional systems, validating the header checksum, decrementing the TTL, and recalculating and updating the header checksum are performed each time a packet is forwarded between two FEs in the router, which requires more resources of the router 210.

The system level overview of the operation of an embodiment of the invention has been described in this section of the detailed description. In one embodiment, the router generates a switch-label for each packet upon receipt by the router, associates the label with the packet and transfers the packet in reference to the label, wherein the label identifies the transfer route within the router. While the invention is not limited to any particular router or packet, for sake of clarity a simplified router and packet has been described. This invention is also independent of the hardware and media connecting the FEs together.

Methods of an Embodiment of the Invention

In the previous section, a system level overview of the operation of an embodiment of the invention was described. In this section, the particular methods performed by the server and the clients of such an embodiment are described by reference to a series of flowcharts. Describing the methods by reference to a flowchart enables one skilled in the art to develop such programs, firmware, or hardware, including such instructions to carry out the methods on suitable computerized clients (the processor of the clients executing the instructions from machine-accessible media). Similarly, the methods performed by the server computer programs, firmware, or hardware are also composed of computer-executable instructions. Methods 300–900 are performed by a router, embodied in software, firmware, or hardware that is a part of a computer, such as computer 110 in FIG. 1.

Figure 3:
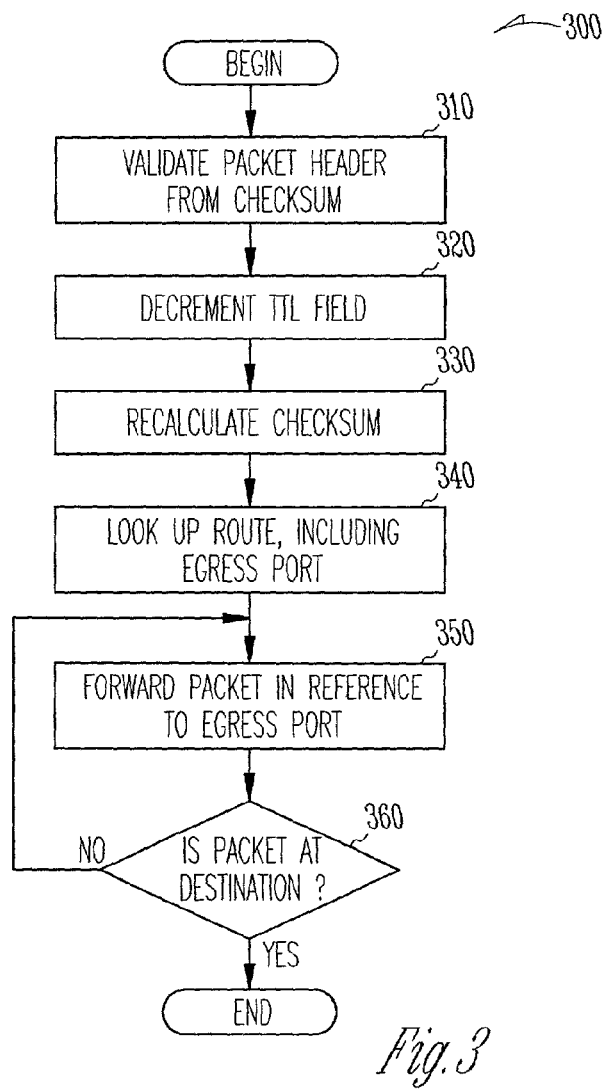
FIG. 3 is a flowchart of a method performed by a router according to an embodiment of the invention.

FIG. 3 is a flowchart of a method 300 performed by a router according to an embodiment of the invention.

In method 300, each packet includes a header and a checksum of the entire packet. Each header includes a time-to-live (TTL) field, and a checksum of the header. In one embodiment, the header is compliant with layer-3. Layer-3 is the network layer of the commonly-referenced multilayered communication model, Open Systems Interconnection (OSI). Internet Protocol (IP) is one example of layer-3. IP is disclosed in Request for Comment (R.F.C.) 791, published by the Internet Engineering Task Force (IETF) in September, 1981.

Method 300 includes validating 310 the header of the packet from the checksum of the packet.

Thereafter, the TTL field of the header is decremented 320. In one embodiment, the TTL is decremented by one to indicate or reflect the transfer of the packet through the router. Subsequently, a checksum of the header from the header is recalculated 330. Thereafter, a route lookup is performed 340. In varying embodiments, the route lookup 340 also includes determining a next-hop and/or determining an egress-port. The egress-port is a port in the FE through which a packet leaves the FE.

Subsequently, method 300 also includes forwarding 350 the packet. The forwarding is performed at least one time while the packet transfers between FEs within the router. The forwarding is performed 360 until the packet arrives at the destination, such as the egress-port. In one example, forwarding 350 the packet includes forwarding the packet in reference to the egress-port that was determined in action 340.

The packet processing includes actions of validating 310, decrementing 320, recalculating 330, and route lookup 340. Performing the packet overhead processing requires processor time and memory resources of the router. In method 300, the packet overhead processing is performed only once for all of the performances of forwarding 350 of the packet within the router. For example, when a packet is received at FE-A 230 in FIG. 2, the overhead processing actions 310–350 are performed. When the packet is forwarded from FE-A 230 in FIG. 2 to FE-B 240 in FIG. 2, FE-B will not perform action 310–340, instead, FE-B will merely perform action 350, thereby forwarding the packet within the router. As a result, method 300 solves the problem of performing the packet overhead processing, such as actions 310–340, multiple times for each forwarding 350 of the packet within the router, which reduces the resources required to transfer a packet through a router, and improves performance of the router.

Table 1 is a pseudo-code representation of an algorithm for inter-FE packet forwarding:

TABLE 1

```
for (packet in external-packet-queue) {
    verify IP header checksum in packet;
    if TTL <2 then discard packet;
    decrement TTL;
    recalculate checksum;
    route lookup to find egress-port;
    if (egress-port is local) {
        perform layer-2 encapsulation;
        transmit packet on egress-port;
    } else {
        apply switch-label to packet;
        switch/forward packet to egress-FE;
    }
}
```

In table 1, the External-Packet-Queue is the queue on which packets arriving from external ports are placed. In one embodiment, the External-Packet-Queue is implemented in the ingress FE, such as FE-A 230 in FIG. 2.

Figure 4:
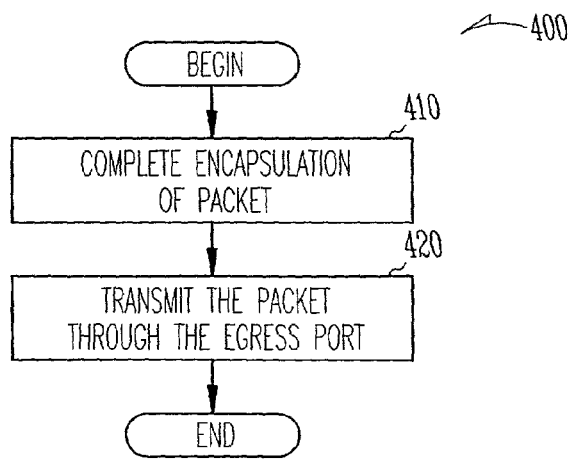
FIG. 4 is a flowchart of a method of forwarding the packet to a destination outside the router, performed by an ingress-forwarding element according to an embodiment of the invention.

FIG. 4 is a flowchart of a method 400 of forwarding the packet to a destination outside the router, performed by an egress-forwarding element (egress-FE) according to an embodiment of the invention. An egress-FE is an FE through which a packet leaves the router. Method 400 is one embodiment of forwarding 350 in FIG. 3 where the egress-port is a local port in an egress-FE. In one embodiment, method 400 is performed by packet forwarding component 1032 in FIG. 10.

Method 400 includes completing 410 the encapsulation of the packet. In one embodiment, the packet is encapsulated in accordance with layer-2. Layer-2 is the data link layer of the commonly-referenced multilayered communication model, Open Systems Interconnection (OSI). The layer-2 describes the movement of data across the physical links in the network. IP encapsulation for Ethernet is an example of layer-2. IP encapsulation for Ethernet is disclosed in Request for Comments (R.F.C.) 894 by the Internet Engineering Task Force (IETF), published in April 1984. In one embodiment of a network using Ethernet, the router redirects data messages at the layer-2 level, using the destination media access control (MAC) address to determine where to send the packet. The data-link layer contains two sub-layers that are described in the Institute of Electrical and Electronics Engineers, Inc. (IEEE) 802 LAN standard, IEEE std. 802-1990, published May 31, 1990: the MAC and a logical link control (LLC). IP encapsulation for IEEE 802 is defined in R.F.C. 1042, published by the IETF in February 1988. The layer-2 is used to verify that an initial connection has been set up, divide output data into data frames, and manage acknowledgements from a receiver that the data arrived successfully. The layer-2 also is used to verify that incoming data has been received successfully by analyzing bit patterns at special places in the frames.

Encapsulation of the packet in accordance with layer-2 is dependent on the protocol of an external network to which the FE of the router is operably coupled. One example of a protocol is Ethernet.

Method 400 thereafter includes transmitting 420 the packet to a destination outside the router, through the egress-port of the router.

Figure 5:
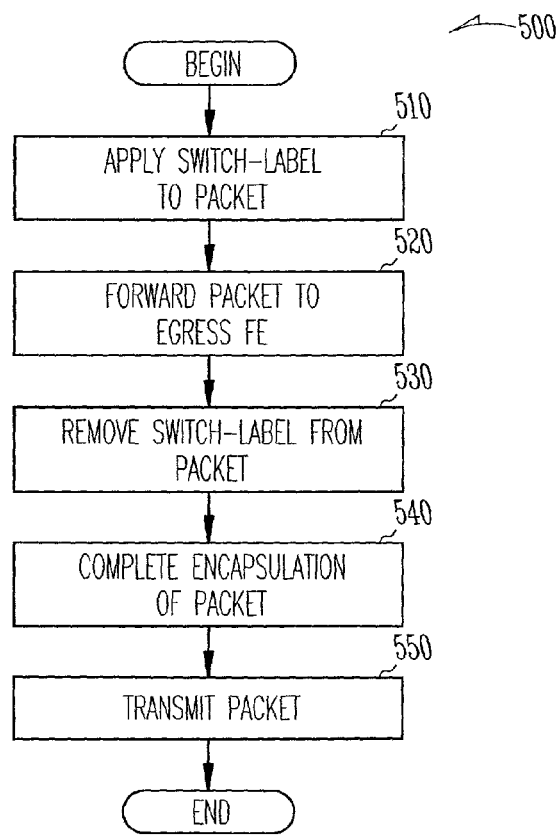
FIG. 5 is a flowchart of a method of forwarding the packet to a destination outside the router, according to an embodiment of the invention.

FIG. 5 is a flowchart of a method 500 of forwarding the packet to a destination outside the router, according to an embodiment of the invention. Method 500 is one embodiment of forwarding 350 in FIG. 3 where the egress-port further comprises a remote port, in which the egress-port is a component of an FE other than the ingress-FE. In one embodiment, method 500 is performed by packet forwarding component 1032 in FIG. 10.

Method 500 includes applying 510 a switch-label to the packet that corresponds to the egress-port and next hop. Action 510 is performed by an ingress-FE.

Thereafter, method 500 includes forwarding 520 the packet to the egress-FE. The egress-FE is an FE through which a packet exists from the router. In varying embodiments, the packet is forwarded through an internal bus of the router, and/or a switched backplane/interconnect of the router. One example of a switched interconnect/backplane is switched interconnect/backplane 225 in FIG. 2. Action 520 is performed by an ingress-FE.

Method 500 also includes receiving the packet at the egress-FE, and removing 530 the switch-label from the packet. Action 530 is performed by the egress-FE.

Subsequently, method 500 includes completing 540 the layer-2 encapsulation of the packet in reference to the external network. Action 540 is performed by the egress-FE.

Thereafter, Method 500 includes transmitting 550 the packet over the egress-port. Action 550 is performed by the egress-FE.

In some embodiments, each FE maintains two tables. The first table is the route lookup table that is used to find the next hop address for packets entering the router through external ports. The second table is a switch-label entry table that is used to find the next hop address for packets that are internally switched between FEs in the router.

Figure 6:
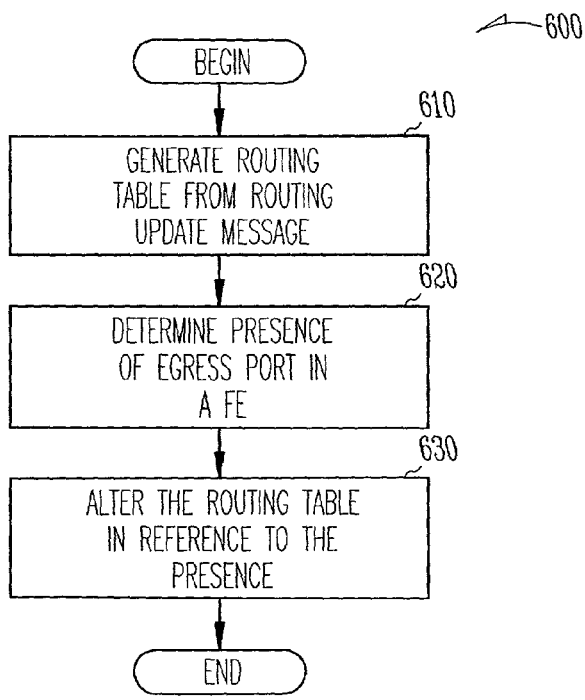
FIG. 6 is a flowchart of a method for maintaining a routing table performed by a control element in a router, according to an embodiment of the invention.

FIG. 6 is a flowchart of a method 600 for maintaining a routing table performed by a control element, such as control element 220 in FIG. 2, in a router, such as router 210 in FIG. 2, according to an embodiment of the invention. Method 600 includes determining, generating, and/or computing 610 the routing table from at least one routing update message. Routing messages are generated by routers running a routing protocol, such as Routing Information Protocol (RIP), an interior gateway protocol that provides routing information such as what networks are accessible and the number of hops required to reach each one. Alternatively, the router may implement Open Shortest-Path First Interior Gateway Protocol (OSPF) which is a link state routing protocol that is an Internet standard Interior Gateway Protocols defined in Internet Engineering Task Force (IETF) R.F.C. 1247, published July 1991.

Method 600 also includes determining 620 the presence of an egress-port in a FE.

Method 600 also includes altering 630 the routing table for each of a plurality of FEs in the router in reference to presence, or lack of presence, of an egress-port in the FE.

In one embodiment of altering 630 where an egress-port is not present in the FE, the altering 630 includes adding a switch-label corresponding to an actual egress interface to the routing table. The switch-label is unique for every port/next-hop pair on the router.

In another embodiment of altering 630 where an egress-port is present in the FE, the altering 630 includes not altering the routing table for a FE.

Figure 7:
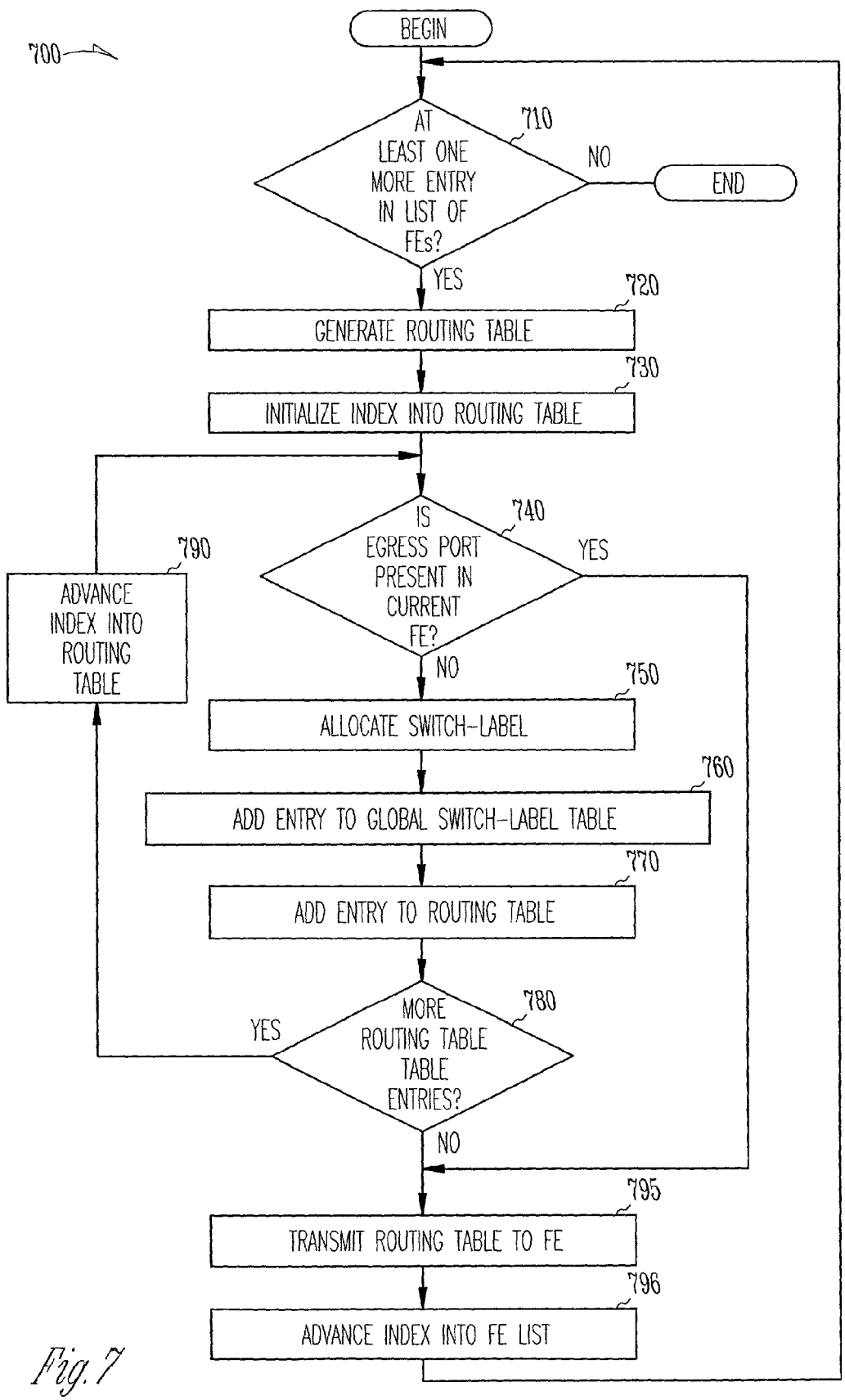
FIG. 7 is a flowchart of a method for maintaining a routing table performed by a control element in a router, according to an embodiment of the invention.

FIG. 7 is a flowchart of a method 700 for maintaining a routing table performed by a control element in a router according to an embodiment of the invention. The routing table describes routing between the FEs within the router and between various networks. In one embodiment, method 700 is performed by a route table manager 1027 in FIG. 10.

Method 700 includes determining if another entry exists in a list of FEs 710. If not, the method ends. If another entry exists, then a routing table is generated 720 for the next FE in the list of FEs, such as by copying a global routing table to the routing table. The global routing table includes addressing information of other routers.

Thereafter, an index into the routing table is initialized 730, such as initializing the index to point to the first element in the routing table. Subsequently, for each entry included in the routing table, method 700 includes determining 740 whether or not an egress port is present in the current FE of the list of FEs. If the determining indicates negative, then a switch-label for an egress-port and/or a next hop of a FE in the router is allocated 750, a entry indicating the label, egress-port, and/or next-hop is added 760 to a global switch-label table, and a switch-label corresponding to the egress-port and/or the next hop is added 770 to the routing table.

Subsequently, a determination 780 of whether more entries exist in the routing table is performed. If so, the index into the routing table is advanced 790, and the method continues with determining 740 whether or not an egress port is present in the current FE of the list of FEs. If not, the routing table is transmitted 795 to the current FE in the FE list, an index into the FE list is advanced 796, and the method continues with determining if another entry exists in a list of FEs 710.

Table 2 is a pseudo-code representation of an algorithm to calculate a routing table:

TABLE 2

```
for (FE in FE-LIST) {
    RT = GlobalRT; // make a copy of the global routing table
    for (each entry in RT) {
        if (egress-port NOT present in FE) {
            allocate switch-label for egress-port/next hop;
            add entry (label/egress-port/next-hop) to globalSLT;
            add switch-label corresponding to the egress-port/next hop in RT;
        }
    }
    send RT to FE;
}
```

In Table 2, the FE-LIST is a list of FEs that is controlled by the CE. The GlobalRT is a routing table that is generated by the CE using routing protocols, such as RIP and OSPF. GlobalSLT is the switch-label table with label information for all FEs.

Figure 8:
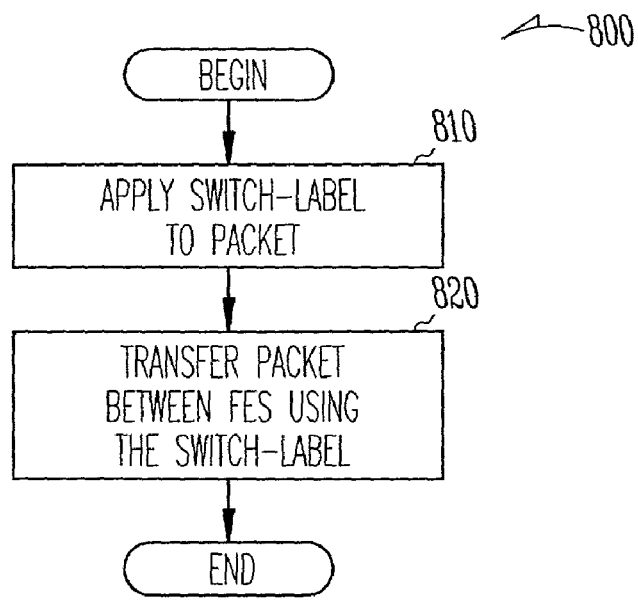
FIG. 8 is a flowchart of a method for internal packet switching in a router performed by a router, according to an embodiment of the invention.

FIG. 8 is a flowchart of a method 800 for internal packet switching in a router performed by a router according to an embodiment of the invention. In one embodiment, method 300 includes method 800.

Method 800 includes applying 810 a switch-label to at least one packet. The switch-label uniquely identifies a port/next-hop on the egress-FE in a plurality of FEs that are operably coupled to each other in the router through a transfer connection. The transfer connection is selected from the group consisting of a single bus, and a switched backplane/interconnect. One example of a switched interconnect/backplane is switched interconnect/backplane 225 in FIG. 2.

Method 800 also includes transferring 820 the packet between the plurality of FEs in reference to the switch-label. The switch-label is used by the FEs to transfer the packet within the router. In the embodiment where method 300 includes method 800, the forwarding 350 in method 300 includes transferring 820.

Figure 9:
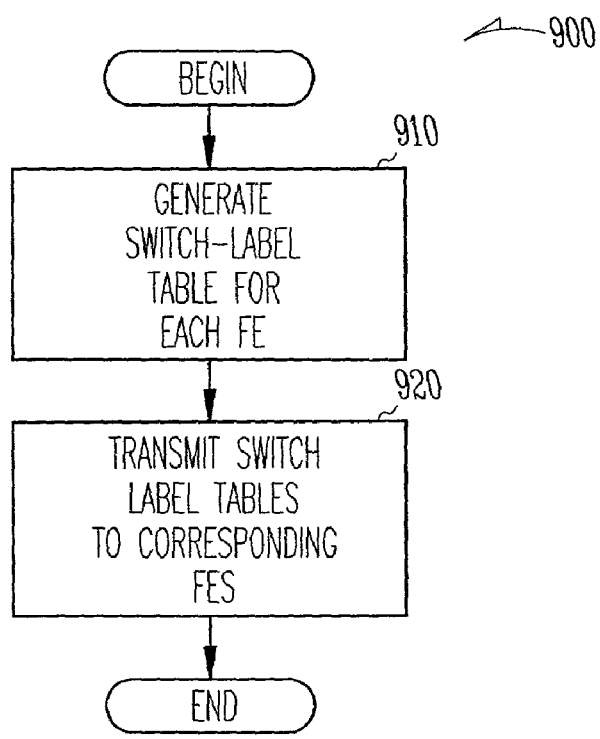
FIG. 9 is a flowchart of a method for switch-label table calculation performed by a control element in a router, according to an embodiment of the invention.

FIG. 9 is a flowchart of a method 900 for managing a switch-label table calculation performed by a control element in a router according to an embodiment of the invention. In one embodiment, method 900 is performed by a switch-label table manager 1028 in FIG. 10.

Method 900 includes determining, generating, and/or computing 910 switch-label table for each FE in the router. A unique label identifies each port/next-hop pair in the router. The switch-label table is unique for each router.

Method 900 also includes transmitting 920 the switch-label table for each corresponding FE in the router.

Table 3 is a pseudo-code representation of an algorithm to calculate a switch-label table:

TABLE 3

```
for (FE in FE-LIST) {
    SLT;
    for (each entry in GlobalSLT) {
        if (egress-port present in FE) {
            add entry to the SLT;
        }
    }
```

TABLE 3-continued

```
    send SLT to FE;
}
```

In Table 3, the FE-LIST is a list of FEs that is controlled by the CE. The SLT is the switch-label table that is generated. The GlobalSLT is the switch-label table with label information for all FEs.

In one embodiment, methods 300–800 are implemented as a computer data signal embodied in a carrier wave, that represents a sequence of instructions which, when executed by a processor, such as processor 118 in FIG. 1, cause the processor to perform the respective method.

In another embodiment, methods 300–800 are implemented as a machine-accessible medium having computer-executable instructions to cause a computer to perform the respective method.

Open Networking Implementation

Figure 10:
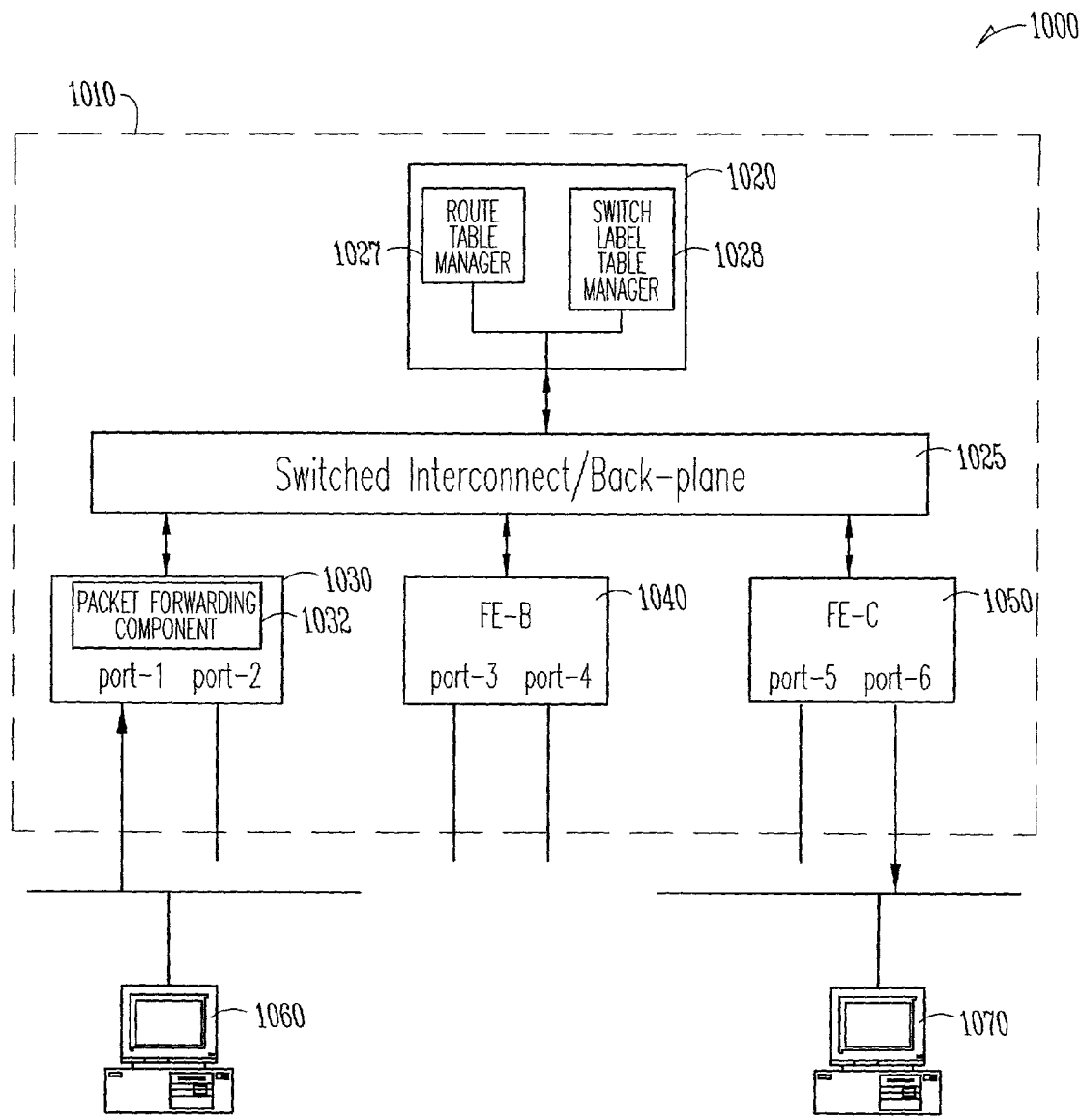
FIG. 10 is a diagram of an apparatus according to an Open Networking embodiment of the invention.

Referring to FIG. 10, a particular implementation of the invention that is compliant with Open Networking is described in conjunction with the system overview in FIG. 2, and the methods described in conjunction with FIGS. 3, 4, 5, 6, and 8. Apparatus 1000 that implements Open Networking is a distributed router architecture for a router 1010 that comprises a single control element (CE) 1020 and multiple forwarding elements (FEs), such as FE-A 1030, FE-B 1040, and FE-C 1050. In addition, communications between the FEs and the CE along a switched interconnect/backplane 1025 are compliant with the Connect Transport Specification (CTS). CTS is a communication protocol. In apparatus 1000, all the FEs are directly connected to a single bus or switched backplane. The switching mechanism could be propriety or could be a standard circuit switched mechanism such as ATM.

In one embodiment of the control element 1020, the control element 1020 includes a route table manager 1027 that performs method 800. In another embodiment, of the control element 1020, the control element 1020 includes a switch-label table manager 1028 that performs method 900. FE-A is an ingress-FE. In one embodiment, and ingress-FE is an FE that receives packets from the external networking environment. In one embodiment of the ingress-FE 1030, the ingress-FE 1030 includes a packet forwarding component 1032, that performs method 400. In one embodiment of the router 1010, the coupling includes Ethernet-compliant communication paths.

In one embodiment, the external network does not support circuit switching. In varying embodiments, the external network that does not support circuit switching in an IP network connected using Ethernet or an ATM/MPLS network. One example of the external networking environment is the Internet. The external networking environment includes computer 1060 that send packets destined to computer 1070, through the router 1010.

A packet is received by ingress FE 1030, and a switch-label that identifies the route of the packet through or within the router 1010, is associated with the packet. The route is between FEs in the router 1010. The switch-label is relatively concise in comparison to the destination address of the packet because of the far fewer addresses of FEs within the router 1010. The switch-label is much easier to process as the packet passes from one FE to the next within the router 1010 because of the relative conciseness of the switch-label.

In the received packet, the ingress-FE is generated and associated with the packet, the actions of validating the header checksum, decrementing the time-to-live (TTL), and recalculating and updating the header checksum are performed. However, these actions are not performed for each subsequent FE in the router. Rather, these actions are performed only once, by the ingress-FE, while the packet is transferred within the router 1010.

The apparatus 1000 components of the route table manager 1027, switch-label table manager 1028, and the packet forwarding component 1032 can be embodied as computer hardware circuitry or as a machine-accessible program, or a combination of both.

More specifically, in the machine-accessible program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). The components execute on as few as one computer as in computer 110 in FIG. 1, or on at least as many computers as there are components.

Systems and methods are provided through which a packet is transferred within a router through the use of a switch-label. The switch-label is generated upon receipt of a packet by a component of the router. The switch-label indicates an address within the router of another component within the router that will transmit the packet to a destination outside the router. The switch-label uses an abbreviated address of components within the router. The address is abbreviated because the number of potential addresses within a router is significantly less than the number of addresses outside the router that require a full address. As a result, transferring of the packet within the router is faster because processing the switch-label using an abbreviated address is faster than processing a full address.

A router that supports internal switch-labels has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, although described in procedural terms, one of ordinary skill in the art will appreciate that the invention can be implemented in an object-oriented design environment or any other design environment that provides the required relationships.

In particular, one of skill in the art will readily appreciate that the names of the methods and apparatus are not intended to limit embodiments of the invention. Furthermore, additional methods and apparatus can be added to the components, functions can be rearranged among the components, and new components to correspond to future enhancements and physical devices used in embodiments of the invention can be introduced without departing from the scope of embodiments of the invention. One of skill in the art will readily recognize that embodiments of the invention are applicable to future communication devices, different file systems, and new data types.

The terminology used in this application is meant to include all object-oriented, database, router, and communication environments and alternate technologies that provide the same functionality as described herein. Therefore, it is manifestly intended that this invention be limited only by the following claims and equivalents thereof

We claim:

1. A method comprising:
   validating a header of a packet from a first checksum of the packet;
   decrementing a time-to-live field of the header;
   recalculating a second checksum of the header;
   performing a route lookup; and
   forwarding the packet,
      wherein the validating a header, the decrementing a time-to-live, the recalculating a second checksum, and the performing a route lookup are performed only once for the packet during transfer among a plurality of ports within a router, wherein the validating a header, the decrementing a time-to-live, the recalculating a second checksum, and the performing a route lookup are performed before the packet is transferred to a switched interconnect/backplane of the router.

2. The method of claim 1, wherein the performing a route lookup further comprises:
   determining a next-hop; and
   determining an egress-port.

3. The method of claim 2, wherein the forwarding further comprises:
   forwarding the packet in reference to the egress-port.

4. The method of claim 2, wherein the egress-port further comprises a remote port, and the forwarding further comprises:
   forwarding the packet to an egress-forwarding element through the switched interconnect/backplane of the router;
   applying a switch-label that corresponds to the egress-port and next hop;
   determining the next hop and the egress-port on which the packet is to be transmitted in reference to the switch-label;
   removing the label;
   completing a layer-2 encapsulation of the packet; and
   transmitting the packet over the egress-port.

5. The method of claim 2, wherein forwarding the packet comprises completing an encapsulation of the packet.

6. The method of claim 1, wherein performing the route lookup comprises adding to a table of the router a switch-label that identifies a route of the packet.

7. The method of claim 1, wherein performing the route lookup comprises applying a switch-label to the packet, wherein the switch-label uniquely identifies an address within the router in which the address is an address of a port/next-hop on an egress-forwarding element within the router, wherein the egress-forwarding element is one of a plurality of forwarding elements within the router, wherein the forwarding elements are operably coupled to each other through the switched interconnect/backplane.

8. A machine-accessible medium having associated instructions to direct a machine to perform:
   validating a header of a packet from a checksum of the packet;
   decrementing a time-to-live field of the header;
   recalculating the checksum of the header;
   performing a route lookup;
   determining an egress-port; and forwarding the packet in reference to the egress-port of the packet, wherein the validating action, the decrementing action and the recalculating action are performed only once for the packet during transfer among a plurality of ports within a router, and wherein the validating action, and the recalculating action are performed by only one port of the plurality of ports of the route and are performed before the packet is transferred to a switched interconnect/backplane of the router.

9. The machine-accessible medium of claim 8 wherein the egress-port further comprises a remote port, and the forwarding further comprises:

forwarding the packet to the egress-forwarding element through the switched interconnect/backplane of the router;

applying a switch-label that corresponds to the egress-port and a next hop;

determining the next hop and the egress-port on which the packet is to be transmitted in reference to a switch-label;

removing the switch-label;

completing a layer-2 encapsulation of the packet; and transmitting the packet over the egress-port.

10. The machine-accessible medium of claim 8, wherein performing the route lookup comprises adding to a table of the router a switch-label that identifies a route of the packet.

11. The machine-accessible medium of claim 8, wherein forwarding the packet further comprises completing an encapsulation of the packet.

12. The machine-accessible medium of claim 8, wherein performing the route lookup comprises applying a switch-label to the packet, wherein the switch-label uniquely identifies an address within the router in which the address is an address of a port/next-hop on an egress-forwarding element within the router, wherein the egress-forwarding element is one of a plurality of forwarding elements within the router, wherein the forwarding elements are operably coupled to each other through the switched interconnect/backplane.

13. An apparatus comprising:

a plurality of forwarding elements; and a control element operably coupled through a switched interconnect/backplane to the plurality of forwarding elements, the control element comprising a switch-label table manager to generate a switch-label table for each forwarding element of the plurality of forwarding elements, wherein at least one forwarding element of the plurality of forwarding elements is to receive a packet and to perform validating a header of the packet from a first checksum of the packet, decrementing a time-to-live field of the header, recalculating a second checksum of the header, performing a route lookup, and forwarding the packet, wherein validating the header, decrementing the time-to-live, recalculating the second checksum, and performing the route lookup are performed only once for the packet during transfer among the plurality of plurality of forwarding elements, and wherein validating the header, decrementing the time-to-live, recalculating the second checksum, and performing the route lookup are performed before the packet is transferred to the switched interconnect/backplane.

14. The apparatus of claim 13, wherein the control element further comprises a route table manager that maintains a routing table.

15. The apparatus of claim 13, wherein the apparatus includes a router.

16. A system comprising:

a plurality of forwarding elements; and a control element operably coupled through a switched interconnect/backplane to the plurality of forwarding elements, the control element comprising a processor and a software means operative on the processor to generate a switch-label table for each forwarding element of the plurality of forwarding elements, wherein at least one forwarding element of the plurality of forwarding elements is to receive a packet and to perform validating a header of the packet from a first checksum of the packet, decrementing a time-to-live field of the header, recalculating a second checksum of the header, performing a route lookup, and forwarding the packet, wherein validating the header, decrementing the time-to-live, recalculating the second checksum, and performing the route lookup are performed only once for the packet during transfer among the plurality of plurality of forwarding elements, and wherein validating the header, decrementing the time-to-live, recalculating the second checksum, and performing the route lookup are performed before the packet is transferred to the switched interconnect/backplane.

17. The system of claim 16, wherein the control element further comprises a route table manager that maintains a routing table.

* * * * *

UNITED STATES PATENT AND TRADEMARK OFFICE
CERTIFICATE OF CORRECTION

PATENT NO. : 7,200,146 B2
APPLICATION NO. : 09/932294
DATED : April 3, 2007
INVENTOR(S) : Khosravi et al.

Page 1 of 1

It is certified that error appears in the above-identified patent and that said Letters Patent is hereby corrected as shown below:

On the face page, in field (57), under "Abstract", in column 2, line 11, delete "fill" and insert -- full --, therefor.

In column 14, line 9, in Claim 13, after "the plurality of" delete "plurality of". (second occurrence)

In column 14, line 38, in Claim 16, after "plurality of" delete "plurality of". (second occurrence)

Signed and Sealed this

Seventeenth Day of July, 2007

JON W. DUDAS
*Director of the United States Patent and Trademark Office*